Aug. 9, 1932.    G. D. GRAVES    1,871,172
RECOVERY OF WAX FROM OILS
Original Filed Aug. 20, 1926
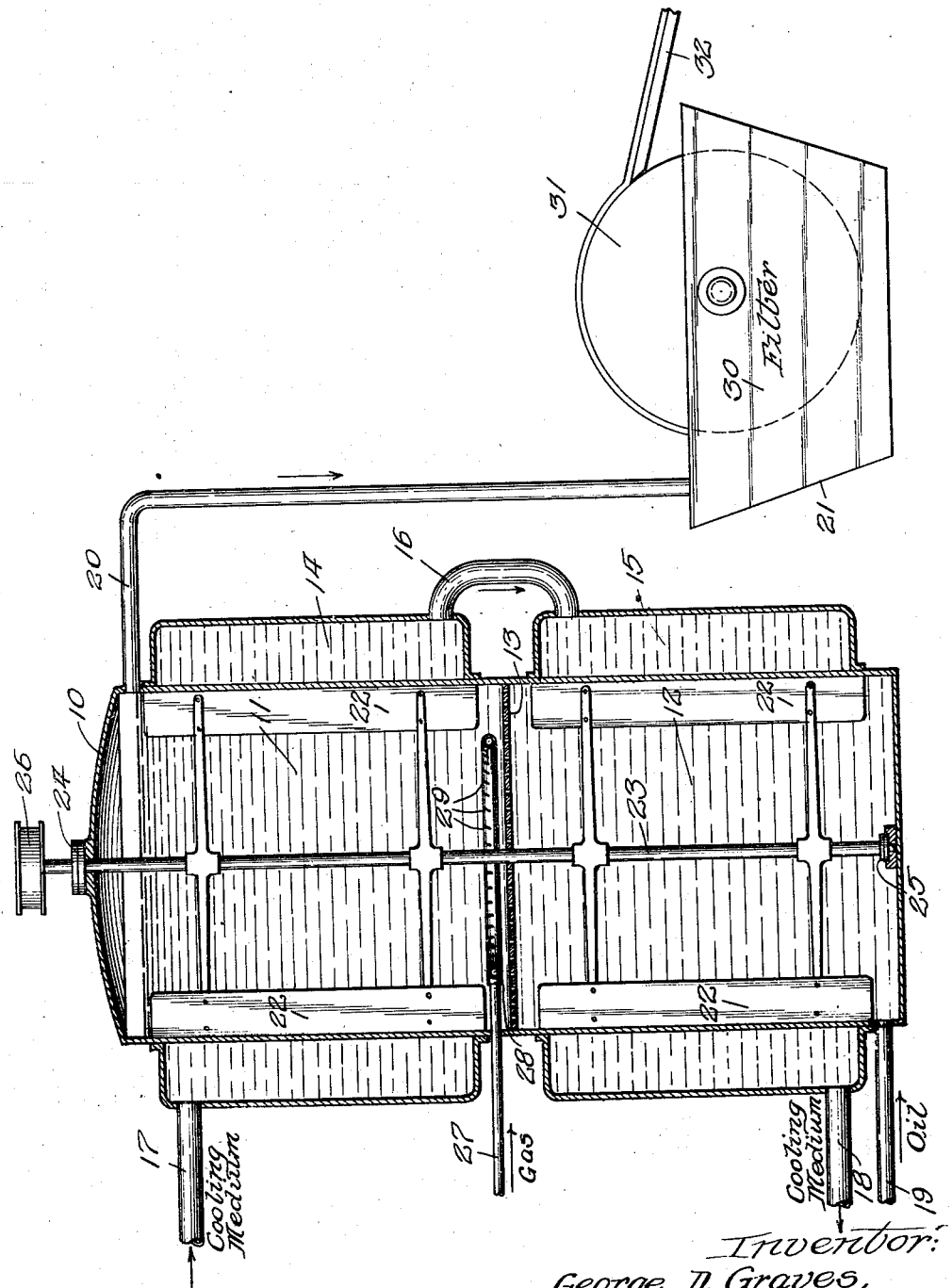
Inventor:
George D. Graves, Patented Aug. 9, 1932

1,871,172

UNITED STATES PATENT OFFICE

GEORGE D. GRAVES, OF CASPER, WYOMING, ASSIGNOR TO STANDARD OIL COMPANY, OF WHITING, INDIANA, A CORPORATION OF INDIANA

RECOVERY OF WAX FROM OILS

Application filed August 20, 1926, Serial No. 130,444. Renewed May 29, 1930.

This invention relates to the recovery of wax from oils containing relatively large proportions of wax, for example, foot's oil.

According to the present invention, foot's oil or similar oil is cooled below its chill point, while subjecting to agitation, a fine grained mushy mass being produced. A temperature in the neighborhood of 70° F., for example, between 63 and 73° is suitable in the case of foot's oil. This mass is impregnated with air or other suitable gas so that small gas bubbles are dispersed throughout the mass and while in this condition, it is filtered. This treatment with gas may be effected simultaneously with or subsequent to the chilling. A rotary filter of the drum type is preferred since the mass is more rapidly handled and the gas bubbles have less opportunity to segregate. Good results may, however, be obtained by ordinary filter-presses. Filtration yields a porous cake of wax from which the oil is readily removed. The cake thus produced contains a large percentage of wax and is suitable for sweating, giving dry wax in quantity about double that which could be obtained by sweating the foot's oil.

The accompanying drawing illustrates an apparatus suitable for carrying out the improved method, the chiller-mixer being shown in section and the filter diagrammatically.

The invention will readily be understood from the following example.

Foot's oil containing 52.6% of oil and having a melting point of 86° F. was chilled to 65° F. with thorough agitation and injection of air so as to produce a fine, aerated mushy mass. The chilled aerated mushy mass was then filtered in an Oliver or drum type rotary filter, giving a porous cake which separated cleanly from the blanket. This wax contained 21.6% of oil; its melting point was 104° F. and in amount it corresponded to 32% of the foot's oil and contained 53% of the wax in the original foot's oil. This wax was sweated at 110° F. for 15 hours and yielded a wax containing 0.5% of oil and having a melting point of 118° F. The amount of wax was 13.0% of the original foot's oil. In comparison, it may be stated that by direct sweating of foot's oil, only 6.9% of high melt point wax was obtained and, moreover, the sweating of foot's oil is very tedious since slow sweating is necessary.

Referring to the accompanying drawing, 10 is a chiller-mixer comprising a vertical tank divided into two superimposed compartments 11 and 12 which are separated by a perforated partition 13. The compartments 11 and 12 are provided with cooling jackets 14 and 15, preferably connecting through pipe 16, the upper cooling jacket 14 being provided with an inlet 17 for the cooling medium and the lower cooling jacket being provided with an outlet 18 for cooling medium. The lower compartment 12 is provided near its bottom with an oil inlet pipe 19 and the upper compartment 11 is provided in its upper portion with an oil outlet pipe 20 which leads the mushy mass to the filter 21. The compartments 11 and 12 are provided with effective agitators which may suitably be vanes 22 mounted on a shaft 23 which extends through the top of the chiller-mixer and through the perforated partition 13 and is provided with suitable bearings 24 and 25 in the top and bottom of the chiller-mixer. The stem 23 is provided with any suitable driving gear such as the pulley 26. The vanes 22 are preferably arranged to scrape the internal walls of the compartments 11 and 12, thereby ensuring more uniform cooling and a finer mushy mass. Above the perforated partition 13, an air pipe 27 passes into the compartment 11, said pipe communicating with an annular pipe 28 provided with perforations 29 directed upwards. The filter 21 diagrammatically shown, comprises a trough 30 and a rotating drum 31, the cylindrical surface of which is provided with filter blanket. The drum is divided internally into compartments communicating through the hollow trunnion and through suitable valves to exhausting and pressure pumps so that vacuum is applied to the submerged portion of the drum for the purpose of lifting a layer of wax, and pressure is applied in the upper portion of the drum, so as to detach the layer from the blanket, so that it can readily be removed by the scraper 32. A detailed description of this filter is considered unnecessary since this type of filter is well known to those skilled in the art. It is to be understood, however, that the invention is not limited to such a filter, since ordinary filter-presses may be used to give a substantial yield of wax.

The operation of the apparatus is as follows:

Foot's oil or similar oil to be treated is fed continuously through pipe 19 to the compartments 12 and 11 and thence to the filter 21 through pipe 20. The stirrer vanes 22 are set in rotation, cooling medium is supplied to the cooling jackets 12, and 15 by pipe 17 and air is supplied by pipe 27.

The cooling is regulated so that the desired filtering temperature, which may be around 70° F. is obtained. The stirring should be sufficiently vigorous to yield a fine mushy mass.

I claim:

1. The method of recovering wax from foot's oil which consists in chilling the oil to about 63 to 73° F., injecting inert gas thereinto and agitating so as to produce a fine mushy mass having small gas bubbles distributed therethrough and filtering the mass while the gas bubbles are thus distributed.

2. The method of recovering wax from foot's oil which consists in cooling the oil below its chill point, injecting inert gas thereinto and agitating so as to produce a fine mushy mass having small gas bubbles distributed therethrough, and filtering the mushy mass while the bubbles are thus distributed.

3. The method of recovering wax from hydrocarbon oil, which consists in cooling the oil containing a substantial proportion of wax below its chill point while injecting inert gas thereinto, thereby producing a mushy mass of oil and wax having small gas bubbles dispersed therethrough and filtering the mushy mass while in that condition.

4. The method of recovering wax from foot's oil which comprises, cooling the oil below its chill point, agitating the oil to form it into a mushy suspension of wax and oil, whereby the physical structure of the wax is broken down and the wax and oil are easily separable, and filtering the suspension to separate the suspended wax from the oil.

5. The method of recovering wax from foot's oil which comprises, cooling the oil below its chill point, agitating the chilled oil to form a mushy suspension of wax and oil, the suspended wax being distributed throughout the oil body, and filtering the said suspension to separate the suspended wax from the oil.

GEORGE D. GRAVES.